United States Patent
Ma et al.

(10) Patent No.: US 11,626,954 B2
(45) Date of Patent: Apr. 11, 2023

(54) POLARIZATION INDICATION SIGNALING FOR CHANNEL STATE INFORMATION REFERENCE SIGNALS

(71) Applicant: QUALCOMM Incorporated, San Diego, CA (US)

(72) Inventors: Liangping Ma, San Diego, CA (US); Xiao Feng Wang, San Diego, CA (US); Ayan Sengupta, San Diego, CA (US); Alberto Rico Alvarino, San Diego, CA (US); Peter Gaal, San Diego, CA (US); Bharat Shrestha, San Diego, CA (US); Jun Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/447,119

(22) Filed: Sep. 8, 2021

(65) Prior Publication Data
US 2022/0109543 A1    Apr. 7, 2022

Related U.S. Application Data

(60) Provisional application No. 63/198,216, filed on Oct. 2, 2020.

(51) Int. Cl.
| | | |
|---|---|---|
| *H04W 72/04* | (2023.01) | |
| *H04L 5/00* | (2006.01) | |
| *H04W 72/044* | (2023.01) | |
| *H04W 72/12* | (2023.01) | |
| *H04W 24/10* | (2009.01) | |

(52) U.S. Cl.
CPC .......... *H04L 5/0051* (2013.01); *H04L 5/0096* (2013.01); *H04W 24/10* (2013.01); *H04W 72/044* (2013.01); *H04W 72/1289* (2013.01)

(58) Field of Classification Search
CPC ... H04L 5/0048; H04L 5/0051; H04L 5/0091; H04L 5/0096; H04W 24/10; H04W 72/044; H04W 72/1289; H04B 7/10; H04B 7/0695; H04B 7/088
See application file for complete search history.

(56) References Cited

U.S. PATENT DOCUMENTS

| | | | |
|---|---|---|---|
| 2017/0202014 A1* | 7/2017 | Moon | H04W 74/006 |
| 2019/0191444 A1* | 6/2019 | Park | H04W 72/1289 |
| 2020/0304191 A1* | 9/2020 | Li | H04L 1/1642 |

(Continued)

OTHER PUBLICATIONS

International Search Report and Written Opinion—PCT/US2021/071411—ISA/EPO—dated Jan. 4, 2022.

(Continued)

*Primary Examiner* — Siu M Lee
(74) *Attorney, Agent, or Firm* — Harrity & Harrity, LLP

(57) ABSTRACT

Various aspects of the present disclosure generally relate to wireless communication. In some aspects, a base station may determine a polarization associated with a channel state information reference signal (CSI-RS) resource set configuration. The base station may transmit, to a user equipment, a polarization indication that indicates the polarization associated with the CSI-RS resource set configuration. Numerous other aspects are provided.

30 Claims, 12 Drawing Sheets

(56) References Cited

U.S. PATENT DOCUMENTS

2022/0109491 A1* 4/2022 Ma .................... H04W 72/0453
2022/0239417 A1* 7/2022 Cheng .................. H04L 1/1896

OTHER PUBLICATIONS

Mediatek Inc: "Summary#4 of 8.4.4 Other Aspects of NR-NTN", 3GPP Draft, R1-2007233, 3GPP TSG RAN WG1 Meeting #102e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 26, 2020 (Aug. 26, 2020), XP051922054, 47 Pages, Retrieved from the Internet: URL: https://ftp.3gpp.org/tsg_ran/WG1_RL1/TSGR1_102-e/Docs/R1-2007233.zip [retrieved on Aug. 26, 2020] Section 4.1, Section 4.2.1, Section 4.3.1.

* cited by examiner

POLARIZATION INDICATION SIGNALING FOR CHANNEL STATE INFORMATION REFERENCE SIGNALS

CROSS-REFERENCE TO RELATED APPLICATION

This Patent Application claims priority to U.S. Provisional Patent Application No. 63/198,216, filed on Oct. 2, 2020, entitled "POLARIZATION INDICATION SIGNALING FOR CHANNEL STATE INFORMATION REFERENCE SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for polarization indication signaling for channel state information reference signals (CSI-RSs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes determining a polarization associated with a channel state information reference signal (CSI-RS) resource set configuration; and transmitting, to a user equipment, a polarization indication that indicates the polarization associated with the CSI-RS resource set configuration.

In some aspects, a method of wireless communication performed by a user equipment includes receiving, from a base station, a polarization indication that indicates a polarization associated with a CSI-RS resource set configuration; and performing a communication with the base station based at least in part on the polarization associated with the CSI-RS resource set configuration.

In some aspects, a base station for wireless communication includes a memory and one or more processors, coupled to the memory, configured to: determine a polarization associated with a CSI-RS resource set configuration; and transmit, to a user equipment, a polarization indication that indicates the polarization associated with the CSI-RS resource set configuration.

In some aspects, a user equipment for wireless communication includes a memory and one or more processors, coupled to the memory, configured to: receive, from a base station, a polarization indication that indicates a polarization associated with a CSI-RS resource set configuration; and perform a communication with the base station based at least in part on the polarization associated with the CSI-RS resource set configuration.

In some aspects, a non-transitory computer-readable medium storing a set of instructions for wireless communication includes one or more instructions that, when executed by one or more processors of a base station, cause the base station to: determine a polarization associated with a CSI-RS resource set configuration; and transmit, to a user equipment, a polarization indication that indicates the polarization associated with the CSI-RS resource set configuration.

In some aspects, a non-transitory computer-readable medium storing a set of instructions for wireless communication includes one or more instructions that, when executed by one or more processors of a user equipment, cause the user equipment to: receive, from a base station, a polarization indication that indicates a polarization associated with a CSI-RS resource set configuration; and perform a communication with the base station based at least in part on the polarization associated with the CSI-RS resource set configuration.

In some aspects, an apparatus for wireless communication includes means for determining a polarization associated with a CSI-RS resource set configuration; and means for transmitting, to a user equipment, a polarization indication that indicates the polarization associated with the CSI-RS resource set configuration.

In some aspects, an apparatus for wireless communication includes means for receiving, from a base station, a polarization indication that indicates a polarization associated with a CSI-RS resource set configuration; and means for performing a communication with the base station based at least in part on the polarization associated with the CSI-RS resource set configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
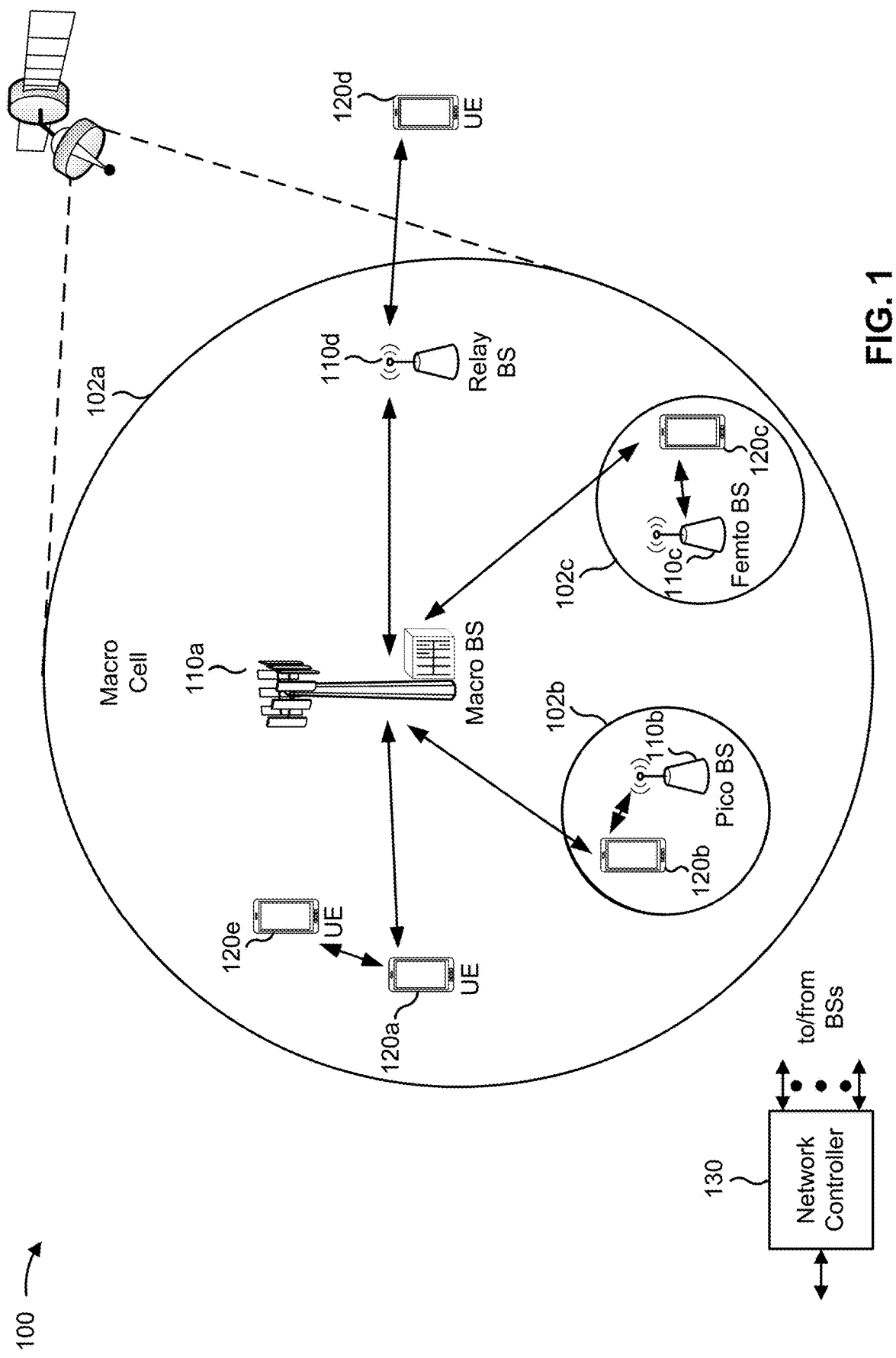
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120

(shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
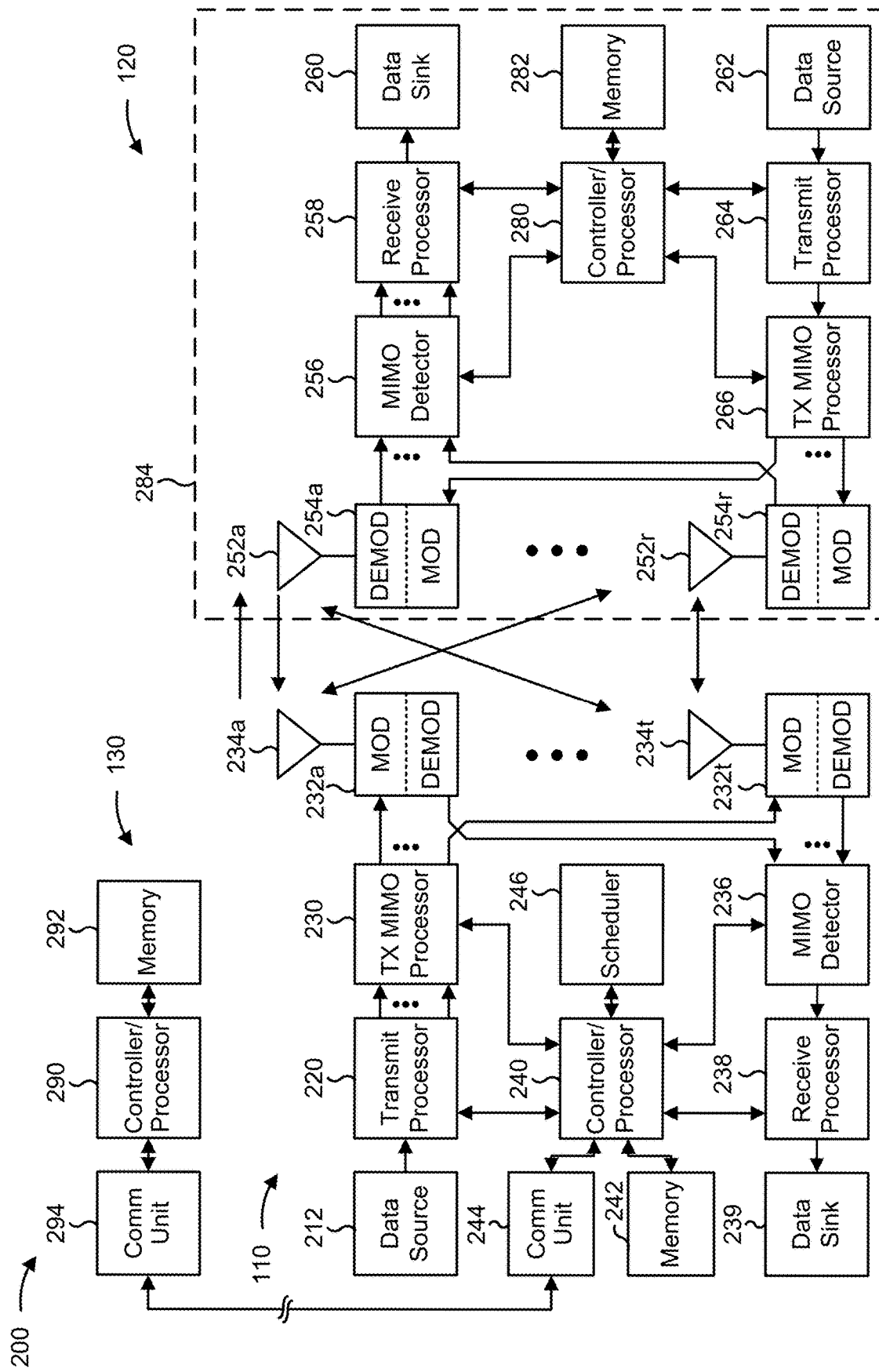
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with polarization indication signaling for channel state information reference signals (CSI-RSs), as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a base station (e.g., base station 110) may include means for determining a polarization associated with a CSI-RS resource set configuration; and/or means for transmitting, to a user equipment, a polarization indication that indicates the polarization associated with the CSI-RS resource set configuration. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, a UE (e.g., UE 120) may include means for receiving, from a base station, a polarization indication that indicates a polarization associated with a CSI-RS resource set configuration; and/or means for performing a communication with the base station based at least in part on the polarization associated with the CSI-RS resource set configuration. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
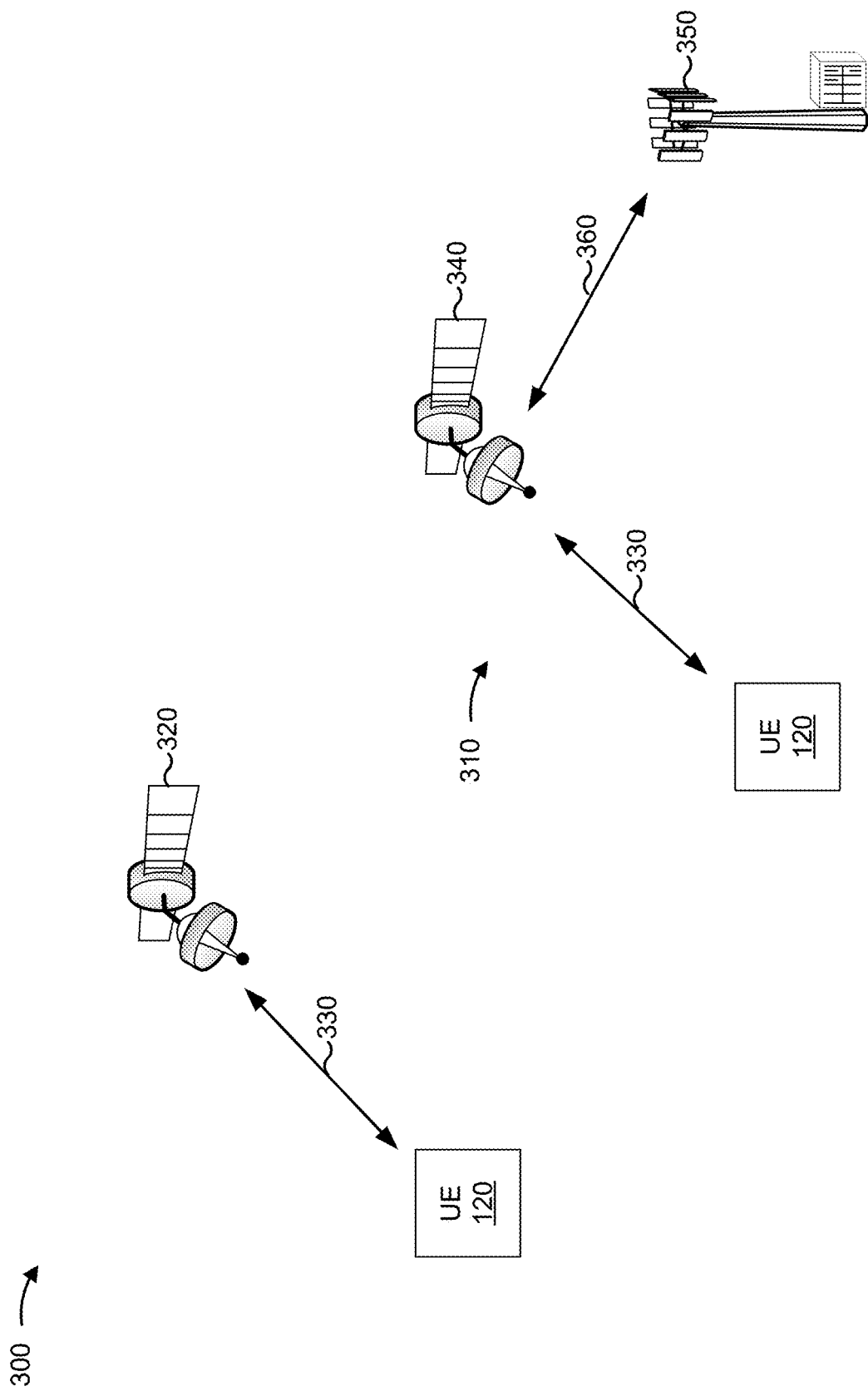
FIG. 3 is a diagram illustrating an example of a regenerative satellite deployment and an example of a transparent satellite deployment in a non-terrestrial network, in accordance with the present disclosure.

FIG. 3 is a diagram illustrating an example 300 of a regenerative satellite deployment and an example 310 of a transparent satellite deployment in a non-terrestrial network, in accordance with the present disclosure.

Example 300 shows a regenerative satellite deployment. In example 300, a UE 120 is served by a satellite 320 via a service link 330. For example, the satellite 320 may include a BS 110 (e.g., BS 110a), and/or a gNB. In some aspects, the satellite 320 may be referred to as a non-terrestrial base station, a regenerative repeater, an on-board processing repeater, and/or a non-terrestrial network entity. In some aspects, the satellite 320 may demodulate an uplink radio frequency signal and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, and/or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
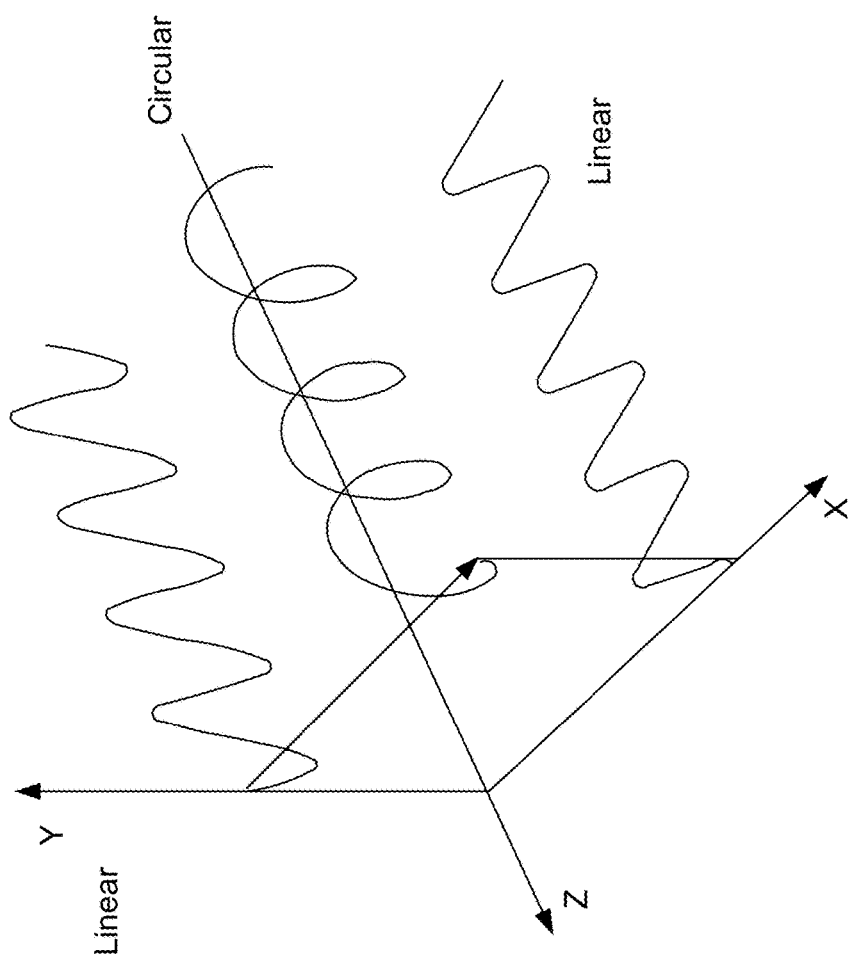
FIG. 4 is a diagram illustrating an example of linear polarization and circular polarization, in accordance with the present disclosure.

FIG. 4 is a diagram illustrating an example 400 of linear polarization and circular polarization, in accordance with the present disclosure.

Linear polarization occurs when the tip of the electric field of an electromagnetic wave at a fixed point in space oscillates along a straight line over time. Circular polarization occurs when the tip of the electric field of an electromagnetic wave at a fixed point in space traces a circle, and it may be formed by superposing two orthogonal linearly polarized waves of equal amplitude and a 90-degree phase difference.

As indicated above, FIG. 4 is provided as an example. Other examples may differ from what is described with regard to FIG. 4.

Figure 5:
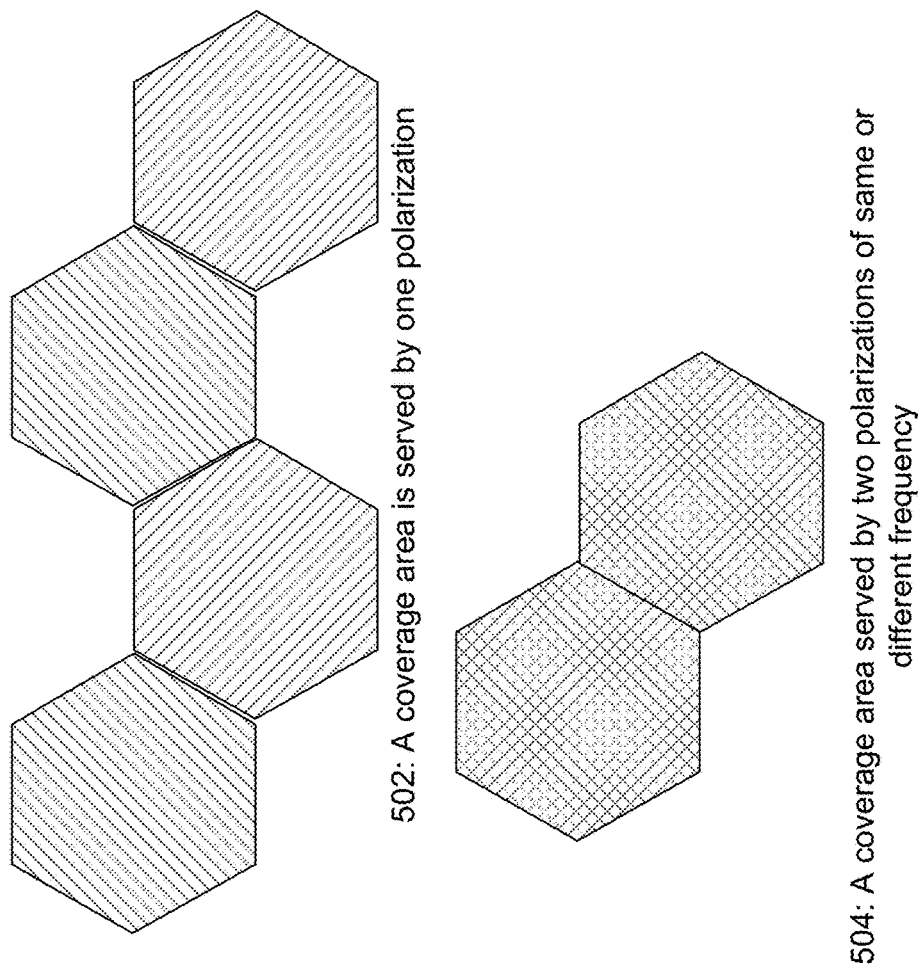
FIG. 5 is a diagram illustrating an example of a coverage area served by one or more polarizations, in accordance with the present disclosure.

FIG. 5 is a diagram illustrating an example 500 of a coverage area served by one or more polarizations, in accordance with the present disclosure.

As shown by reference 502, a coverage area may be served by one polarization to increase a system capacity. One polarization for the coverage area may be beneficial when the coverage area is associated with a sparse constellation of UEs, where the UEs are able to dynamically adjust a polarization. The polarization may be a circular polarization, such as a right hand circular polarization (RHCP) or a left hand circular polarization (LHCP), or the polarization may be a linear polarization, such as a vertical linear polarization or a horizontal linear polarization.

As shown by reference 504, a coverage area may be served by two polarizations to increase a system capacity. The two polarizations may be associated with a same frequency, or the two polarizations may be associated with different frequencies. Two polarizations for the coverage area may be beneficial when the coverage area is associated with a dense constellation of UEs. The two polarizations may be circular polarizations, or the two polarizations may be linear polarizations.

As indicated above, FIG. 5 is provided as an example. Other examples may differ from what is described with regard to FIG. 5.

A transmit polarization may refer to a polarization associated with a transmission from a base station or a UE, and a receive polarization may refer to a polarization associated with a reception at the base station or the UE. In some cases, the transmit polarization may be the same as the receive polarization. However, in other cases, the transmit polarization may be different than the receive polarization, which may result in a polarization mismatch loss. For example, when the transmit polarization is RHCP and the receive polarization is LHCP, the polarization mismatch loss may be greater than 20 dB. When the transmit polarization is a circular polarization and the receive polarization is a linear polarization, or vice versa, the polarization mismatch loss may be about 3 dB. When the transmit polarization is a horizontal linear polarization and the receive polarization is a vertical linear polarization, the polarization mismatch loss may be greater than 20 dB.

Portable devices, such as UEs, may have varying polarization due to movement. Further, linear polarization (e.g., horizontal linear polarization or vertical linear polarization) may not less reliable for portable devices with respect to frequency reuse. Frequency reuse may occur when a specified range of frequencies are used more than once in a same radio system so a total capacity of the radio system is increased without increasing an allocated bandwidth of the radio system.

A UE having a polarization capability may be able to detect a polarization and/or transmit signals with the polarization. For example, a UE capable of two circular polarization modes may be able to detect a circular polarization associated with one of the two circular polarization modes. A UE with two linearly cross-polarized antennas may detect and transmit signals using both circular polarizations.

However, polarization detection may increase processing at the UE. For example, polarization detection for signal transmission and reception with respect to circular and/or linear polarization may increase the processing at the UE. Further, in some cases, the UE may be unable to determine a polarization associated with a signal transmission or reception.

In various aspects of techniques and apparatuses described herein, polarization indication signaling may be configured by a base station to indicate to a UE a polarization. The polarization may be associated with a reference signal resource set configuration, and/or a reference signal associated with the reference signal resource set configuration. For example, the reference signal resource set configuration may be a CSI-RS resource set configuration, and the reference signal may be a CSI-RS. The polarization indication signaling may avoid a polarization mismatch loss at the UE, which may occur when the UE cannot detect the polarization and a mismatch occurs between a transmit polarization and a receive polarization. Even when the UE is capable of detecting the polarization, the polarization indication signaling may reduce an amount of processing that occurs at the UE.

In some aspects, for line of sight signal propagation, the polarization indication signaling may avoid the polarization detection at the UE. In some aspects, for non-line-of-sight and near-line-of-sight signal propagation, the polarization indication signaling may also be useful to the UE. For example, the polarization indication signaling may enable the UE to determine a polarization of a first beam and a polarization of a second beam, and whether the polarization is the same or different with respect to the first beam and the second beam. For a downlink, a receive polarization may be different from a transmit polarization. For an uplink, a transmit polarization may correspond to a receive polarization, assuming downlink and uplink reciprocity (e.g., the uplink and the downlink are relatively close in frequency). For both the downlink and the uplink, the polarization indication signaling may enable the UE to determine the transmit polarization and the receive polarization, where the transmit and receive polarizations may be best transmit and receive polarizations as compared to other transmit and receive polarizations that may be used at the UE and/or the base station.

Figure 6:
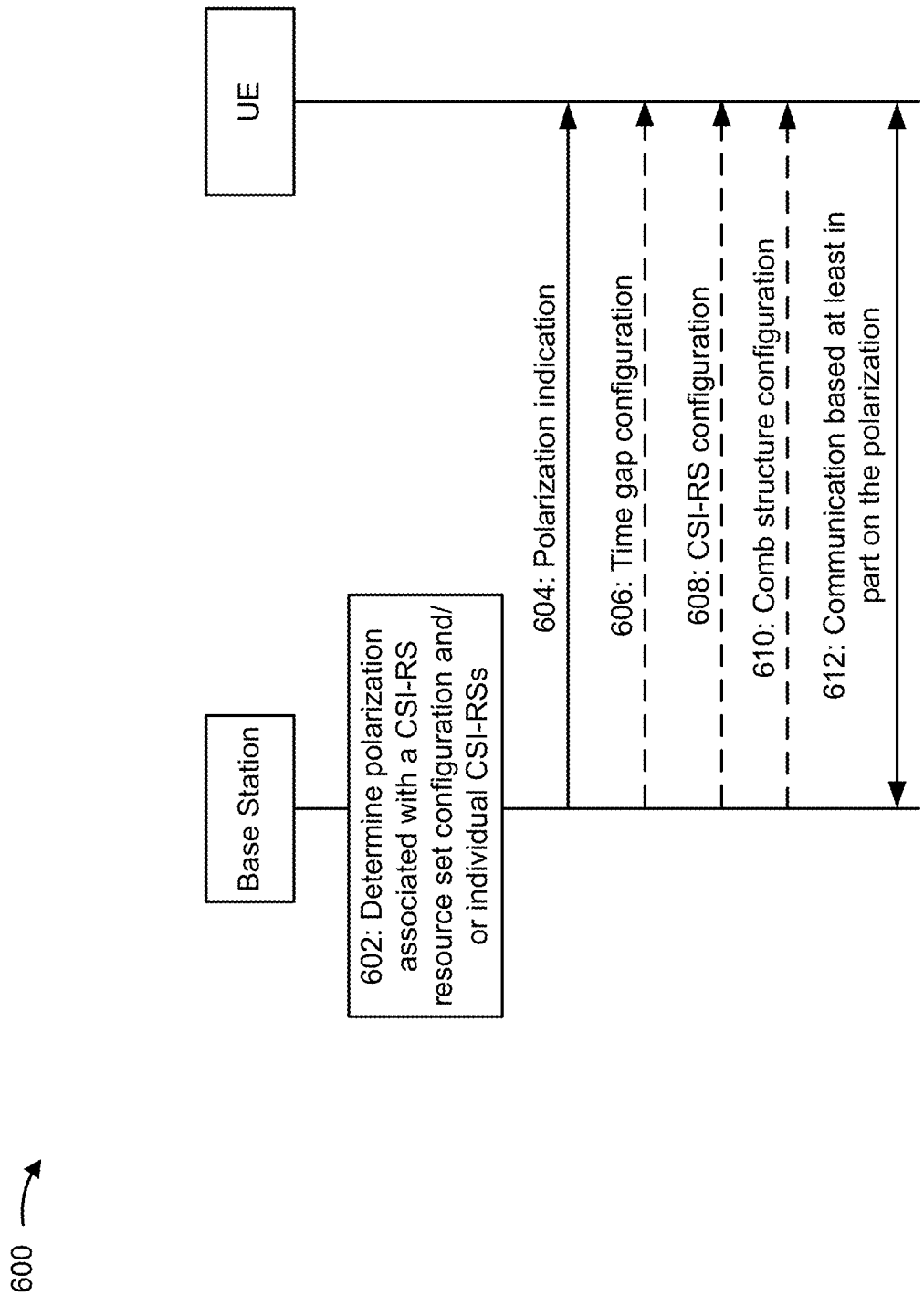
FIGS. 6-8 are diagrams illustrating examples associated with polarization indication signaling for channel state information reference signals (CSI-RSs), in accordance with the present disclosure.

FIG. 6 is a diagram illustrating an example 600 associated with polarization indication signaling for CSI-RSs, in accordance with the present disclosure. As shown in FIG. 6, example 600 includes communication between a base station (e.g., base station 110) and a UE (e.g., UE 120). In some aspects, the base station and the UE may be included in a wireless network such as wireless network 100. The base station and the UE may communicate on a wireless sidelink.

As shown by reference number 602, the base station may determine a polarization associated with a CSI-RS resource set configuration, and/or a polarization for individual CSI-RSs associated with the CSI-RS resource set configuration. In some aspects, the polarization may be predefined for a particular CSI-RS resource set configuration and/or an individual CSI-RS. The polarization may be a RHCP, a LHCP, a vertical linear polarization, and/or a horizontal linear polarization. In some aspects, polarizations for the individual CSI-RSs may be the same, or the individual CSI-RSs may be associated with different polarizations.

In some aspects, the polarization associated with the CSI-RS resource set configuration may correspond to a polarization of a bandwidth part associated with the CSI-RS resource set configuration. The bandwidth part may be associated with a polarization configuration that defines the polarization of the bandwidth part. In other words, the polarization associated with the CSI-RS resource set configuration may be the same as the polarization of the bandwidth part associated with the CSI-RS resource set configuration. For example, a CSI resource configuration information element may configure multiple CSI-RS resource sets and a bandwidth part.

In some aspects, a polarization of a CSI-RS may correspond to the polarization associated with the CSI-RS resource set configuration, where the polarization associated with the CSI-RS resource set configuration may correspond to a polarization of a bandwidth part associated with the CSI-RS resource set configuration. In other words, the polarization of the CSI-RS may correspond to the polarization of the bandwidth part associated with the CSI-RS. The polarization of the CSI-RS may correspond to the polarization of the CSI-RS resource set configuration, which in turn may correspond to the polarization of the bandwidth part.

In some aspects, a polarization of a CSI-RS may correspond to the polarization associated with the CSI-RS resource set configuration which includes the CSI-RS. In this case, a bandwidth part associated with the CSI-RS resource set configuration may not be associated with a polarization configuration. In other words, the polarization of the CSI-RS may correspond to the polarization of the CSI-RS resource set configuration associated with the CSI-RS, but the bandwidth part associated with the CSI-RS resource set configuration may not be configured with a polarization.

In some aspects, the base station may determine a polarization of a CSI-RS associated with the CSI-RS resource set configuration. In some aspects, the base station may determine the polarization of the CSI-RS resource based at least in part on an index, where the polarization may be explicitly configured in the CSI-RS resource and the index may represent one polarization selected from a plurality of polarizations. The polarization of the CSI-RS resource may be a nominal polarization mapped to an actual polarization based at least in part on a detection of a prior synchronization signal block (SSB), which may be useful when a polarization changes due to a signal reflection.

In some aspects, the base station may determine the polarization of the CSI-RS resource based at least in part on a polarization of a source transmission from the base station or the UE. For example, the base station may use a transmission configuration indicator (TCI) state indicating a polarization of the source transmission to determine the polarization of the CSI-RS resource. In some aspects, the base station may determine the polarization of the CSI-RS resource based at least in part on a polarization of a CSI-RS associated with the CSI-RS resource. For example, the base station may determine whether the polarization of the CSI-RS is the same or orthogonal to a polarization of the source transmission, which may be an SSB or a CSI-RS.

As shown by reference number 604, the base station may transmit, to the UE, one or more polarization indications that indicate the polarization associated with the CSI-RS resource set configuration, and/or the polarization associated with the individual CSI-RSs associated with the CSI-RS resource set configuration. For example, the base station may transmit polarization indications corresponding to the individual CSI-RSs, where the polarization indications may correspond to different polarizations for the individual CSI-RSs. In some aspects, the base station may transmit, to the UE, a polarization indication that indicates the polarization associated with the CSI-RS resource, where the CSI-RS resource may be associated with the CSI-RS resource set configuration.

As shown by reference number 606, the base station may transmit, to the UE, a time gap configuration that configures a time gap between a first CSI-RS and a second CSI-RS. For example, the base station may determine a first polarization of the first CSI-RS in a bandwidth part, where the first CSI-RS may be associated with the CSI-RS resource set configuration. The base station may determine a second polarization of the second CSI-RS in the bandwidth part, where the second CSI-RS may be associated with the CSI-RS resource set configuration. The base station may transmit the time gap configuration to the UE based at least in part on the first polarization of the first CSI-RS and the second polarization of the second CSI-RS. The time gap configuration may enable the UE to change between the first polarization when measuring the first CSI-RS to the second polarization when measuring the second CSI-RS.

As shown by reference number 608, the base station may transmit, to the UE, a CSI-RS configuration that configures a first CSI-RS and a second CSI-RS to overlap in time in a single bandwidth part. The first CSI-RS and the second CSI-RS may be associated with the CSI-RS resource set configuration. The first CSI-RS may be associated with a first polarization and the second CSI-RS may be associated with a second polarization. In other words, the first CSI-RS and the second CSI-RS may overlap in time in the single bandwidth part, but the first CSI-RS and the second CSI-RS may be associated with different polarizations.

As shown by reference number 610, the base station may transmit, to the UE, a comb structure configuration that configures a first comb structure for a first CSI-RS in a bandwidth part and a second comb structure for a second CSI-RS in the bandwidth part. The first CSI-RS and the second CSI-RS may be associated with the CSI-RS resource set configuration. The first CSI-RS may be associated with a first polarization and the second CSI-RS may be associated with a second polarization. In other words, the first CSI-RS and the second CSI-RS may be transmitted in a same bandwidth part, but the first CSI-RS and the second CSI-RS may be associated with different polarizations. Further, the first comb structure for the first CSI-RS may not overlap in a frequency domain with the second comb structure for the second CSI-RS.

As shown by reference number 612, the UE may perform a communication with the base station based at least in part on the polarization associated with the CSI-RS resource set configuration, and/or the polarization associated with the individual CSI-RSs. In some aspects, the UE may perform the communication with the base station based at least in part on the polarization associated with the CSI-RS resource associated with the CSI-RS resource set configuration.

As indicated above, FIG. 6 is provided as an example. Other examples may differ from what is described with regard to FIG. 6.

Figure 7:
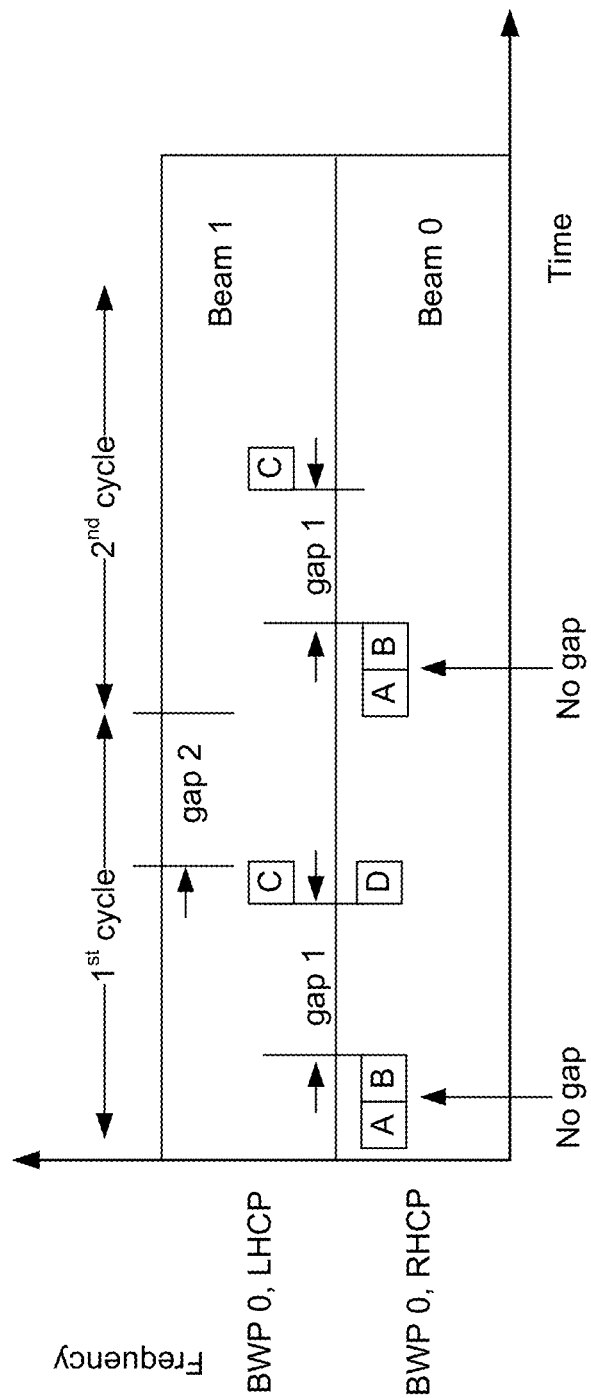

FIG. 7 is a diagram illustrating an example 700 associated with polarization indication signaling for CSI-RSs, in accordance with the present disclosure.

In some aspects, a base station (e.g., base station 110) may configure a time gap between reference signals (e.g., SSB and/or CSI-RS) that are associated with a same bandwidth part but different polarizations. For example, the time gap may be between a first reference signal associated with a first polarization and a second reference signal associated with a second polarization. The time gap may enable a UE to change from the first polarization associated with the first reference signal to the second polarization associated with the second reference signal. The time gap may enable the UE to finish measuring the reference signals in one cycle instead of measuring the reference signals in multiple cycles when the reference signals overlap in time.

As shown in FIG. 7, reference signals A and B may be transmitted in a bandwidth part (BWP 0) associated with a first polarization (e.g., RHCP) and a first beam (beam 0). The reference signals A and B may be separated by no time gap or a minimal time gap. Reference signal C may be transmitted in the bandwidth part (BWP 0) associated with the first polarization (e.g., RHCP) and the first beam (beam 0). Reference signal D may be transmitted in the bandwidth part (BWP 0) associated with a second polarization (e.g., LHCP) and a second beam (beam 1).

In a first cycle, reference signals A and B may be transmitted in accordance with the first polarization. In the first cycle, reference signal D may be transmitted in accordance with the first polarization, and reference signal C may be transmitted in accordance with the second polarization. Reference signal C and reference signal D may overlap in time but may be associated with different polarizations. A first time gap (gap 1) may be configured between reference signals A and B associated with the first polarization and reference signal C associated with the second polarization, which may enable the UE to switch between the first polarization and the second polarization. A second time gap (gap 2) may be configured between reference signal C and subsequent reference signals A and B, which may be associated with a second cycle. In some cases, the first time gap may be equal to the second time gap. Alternatively, the first time gap may be not equal to the second time gap.

As indicated above, FIG. 7 is provided as an example. Other examples may differ from what is described with regard to FIG. 7.

Figure 8:
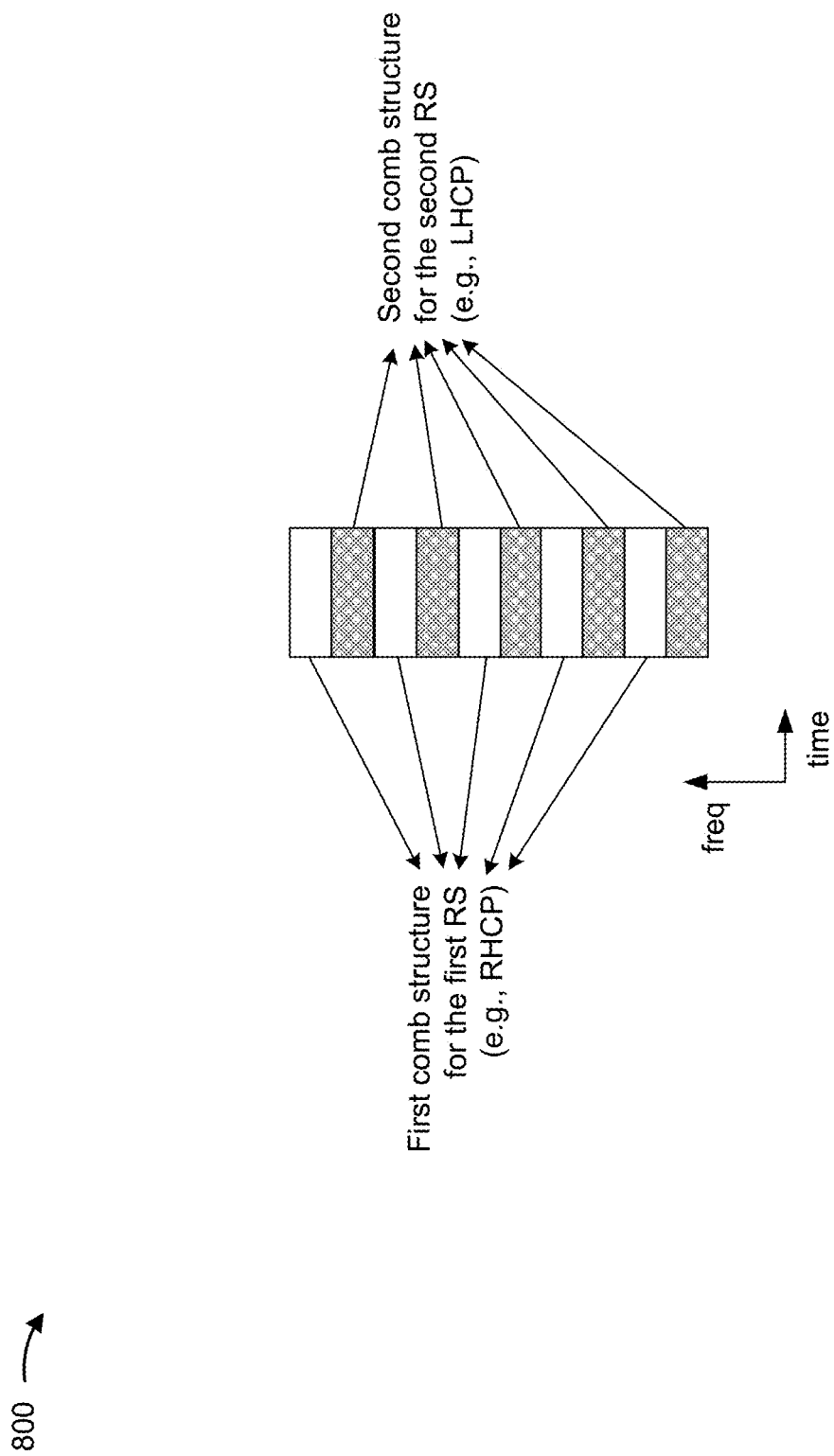

FIG. 8 is a diagram illustrating an example 800 associated with polarization indication signaling for CSI-RSs, in accordance with the present disclosure.

In some aspects, a base station (e.g., base station 110) may configure different comb structures for reference signals (e.g., CSI-RSs) that are in a same bandwidth part but associated with different polarizations. The different comb structures may be non-overlapping in a frequency domain.

As shown in FIG. 8, a first comb structure may be configured for a first reference signal, and a second comb structure may be configured for a second reference signal. The first comb structure may be associated with a first polarization (e.g., RHCP), and the second comb structure may be associated with a second polarization (e.g., LHCP). The first comb structure and the second comb structure may be non-overlapping in the frequency domain.

As indicated above, FIG. 8 is provided as an example. Other examples may differ from what is described with regard to FIG. 8.

Figure 9:
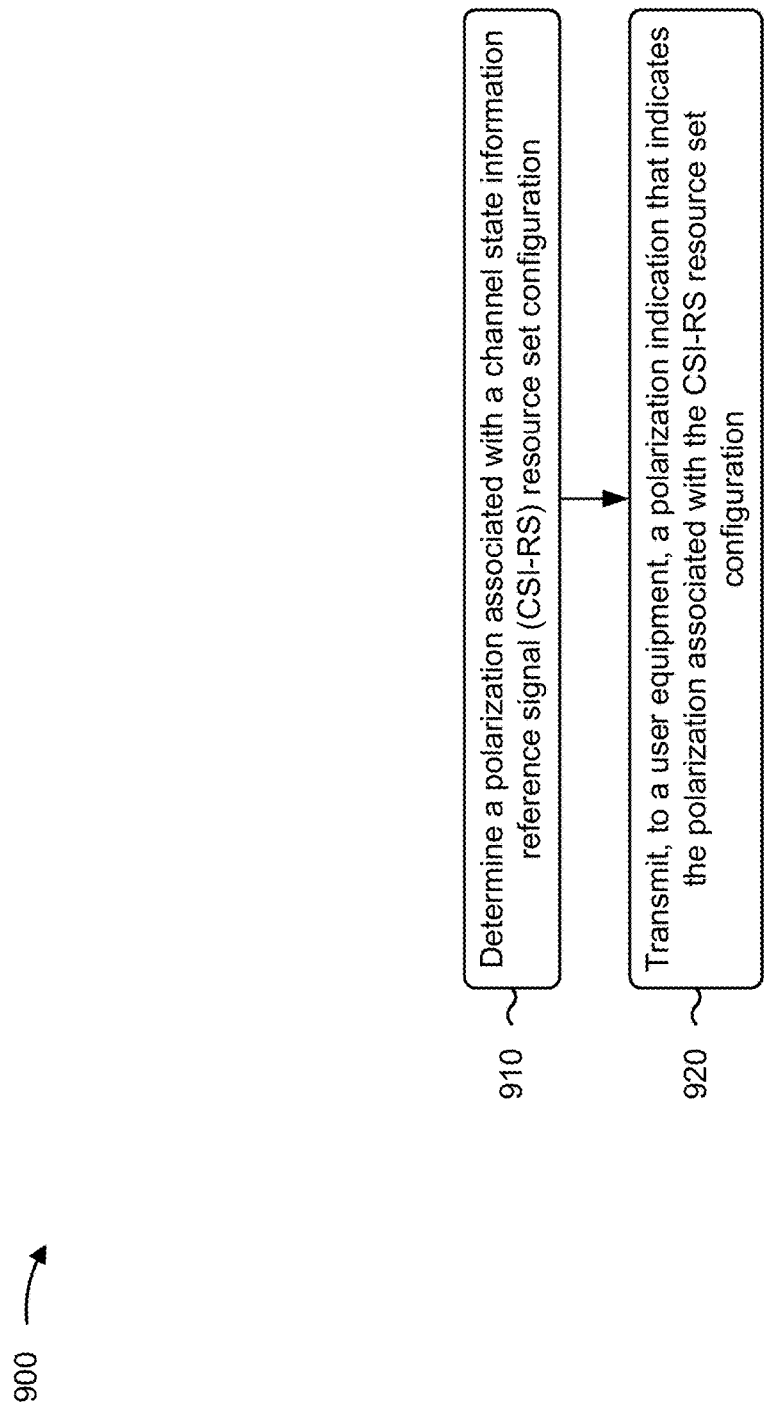
FIGS. 9-10 are diagrams illustrating example processes associated with polarization indication signaling for CSI-RSs, in accordance with the present disclosure.

FIG. 9 is a diagram illustrating an example process 900 performed, for example, by a base station, in accordance with the present disclosure. Example process 900 is an example where the base station (e.g., base station 110) performs operations associated with polarization indication signaling for CSI-RSs.

As shown in FIG. 9, in some aspects, process 900 may include determining a polarization associated with a CSI-RS resource set configuration (block 910). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine a polarization associated with a CSI-RS resource set configuration, as described above.

As further shown in FIG. 9, in some aspects, process 900 may include transmitting, to a user equipment, a polarization indication that indicates the polarization associated with the CSI-RS resource set configuration (block 920). For example, the base station (e.g., using transmit processor 220, TX MIMO processor 230, modulator 232, antenna 234, controller/processor 240, memory 242, and/or scheduler 246) may transmit, to a user equipment, a polarization indication that indicates the polarization associated with the CSI-RS resource set configuration, as described above.

Process 900 may include additional aspects, such as any single aspect or any combination of aspects described below and/or in connection with one or more other processes described elsewhere herein.

In a first aspect, the polarization associated with the CSI-RS resource set configuration corresponds to a polarization of a bandwidth part associated with the CSI-RS resource set configuration, wherein the bandwidth part is associated with a polarization configuration that defines the polarization of the bandwidth part.

In a second aspect, alone or in combination with the first aspect, process 900 includes determining polarizations for individual CSI-RSs associated with the CSI-RS resource set configuration, and transmitting polarization indications corresponding to the individual CSI-RSs, wherein the polarization indications may correspond to different polarizations for the individual CSI-RSs.

In a third aspect, alone or in combination with one or more of the first and second aspects, process 900 includes determining a first polarization of a first CSI-RS in a bandwidth part, wherein the first CSI-RS is associated with the CSI-RS resource set configuration, determining a second polarization of a second CSI-RS in the bandwidth part, wherein the second CSI-RS is associated with the CSI-RS resource set configuration, transmitting, to the user equipment, a time gap configuration that configures a time gap between the first CSI-RS and the second CSI-RS, wherein the time gap enables the user equipment to change between the first polarization when measuring the first CSI-RS to the second polarization when measuring the second CSI-RS.

In a fourth aspect, alone or in combination with one or more of the first through third aspects, process 900 includes transmitting, to the user equipment, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

In a fifth aspect, alone or in combination with one or more of the first through fourth aspects, process 900 includes transmitting, to the user equipment, a comb structure configuration that configures a first comb structure for a first CSI-RS in a bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization.

In a sixth aspect, alone or in combination with one or more of the first through fifth aspects, the first comb structure for the first CSI-RS does not overlap in a frequency domain with the second comb structure for the second CSI-RS.

In a seventh aspect, alone or in combination with one or more of the first through sixth aspects, the polarization associated with the CSI-RS resource set configuration is one of a right hand circular polarization, a left hand circular polarization, a vertical linear polarization, or a horizontal linear polarization.

In an eighth aspect, alone or in combination with one or more of the first through seventh aspects, a polarization of a CSI-RS corresponds to the polarization associated with the CSI-RS resource set configuration, wherein the polarization associated with the CSI-RS resource set configuration corresponds to a polarization of a bandwidth part associated with the CSI-RS resource set configuration.

In a ninth aspect, alone or in combination with one or more of the first through eighth aspects, a polarization of a CSI-RS corresponds to the polarization associated with the CSI-RS resource set configuration which includes the CSI-RS, wherein a bandwidth part associated with the CSI-RS resource set configuration is not associated with a polarization configuration.

In a tenth aspect, alone or in combination with one or more of the first through ninth aspects, the CSI-RS resource set configuration includes a CSI-RS resource configured with the polarization.

In an eleventh aspect, alone or in combination with one or more of the first through tenth aspects, process 900 includes determining the polarization for the CSI-RS resource based at least in part on an index, wherein the polarization is explicitly configured in the CSI-RS resource and the index represents one polarization selected from a plurality of polarizations.

In a twelfth aspect, alone or in combination with one or more of the first through eleventh aspects, the polarization for the CSI-RS resource is a nominal polarization mapped to an actual polarization based at least in part on a detection of a prior synchronization signal block.

In a thirteenth aspect, alone or in combination with one or more of the first through twelfth aspects, process 900 includes determining the polarization for the CSI-RS resource based at least in part on a transmission configuration indicator state.

In a fourteenth aspect, alone or in combination with one or more of the first through thirteenth aspects, process 900 includes determining the polarization for the CSI-RS resource based at least in part on a polarization of a CSI-RS associated with the CSI-RS resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
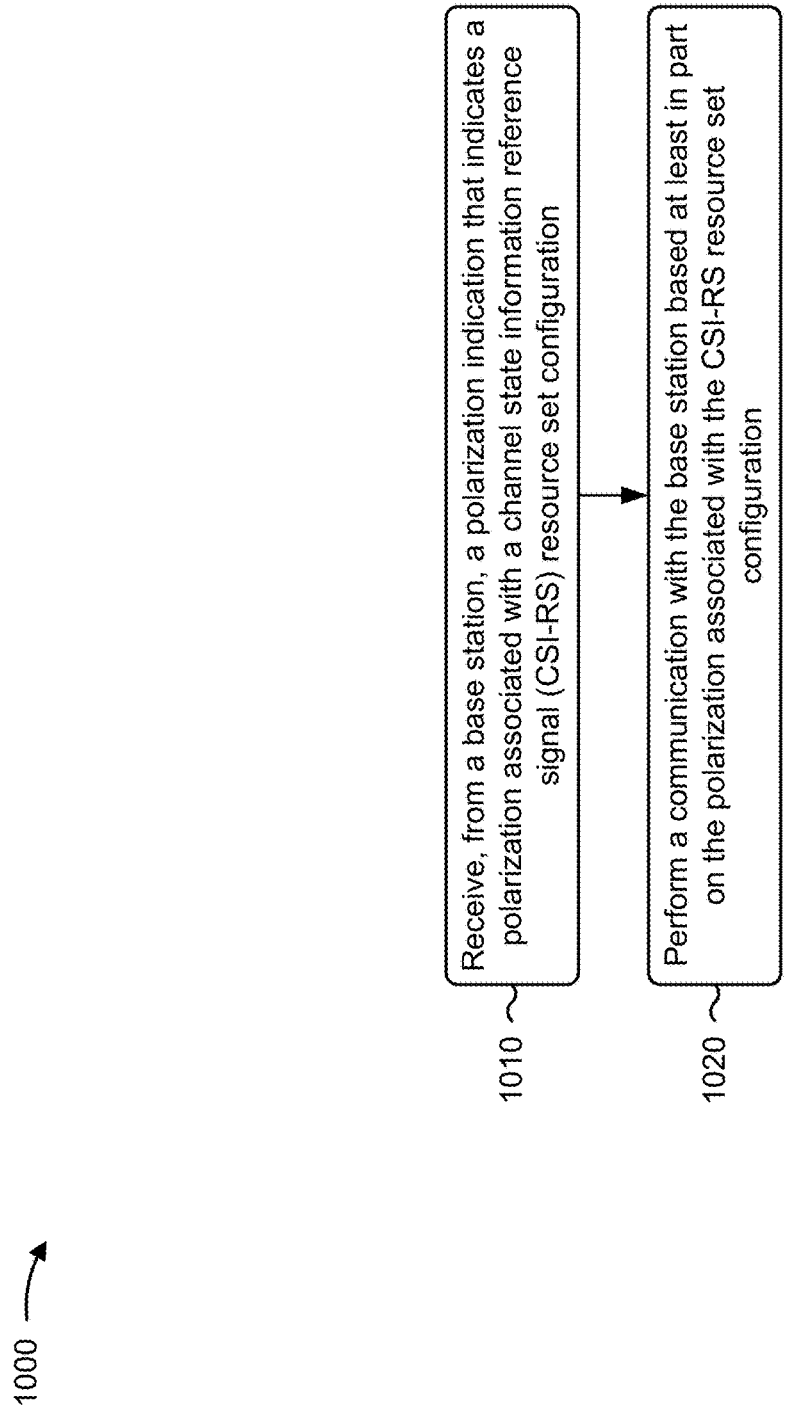

FIG. 10 is a diagram illustrating an example process 1000 performed, for example, by a user equipment, in accordance with the present disclosure. Example process 1000 is an example where the user equipment (e.g., user equipment 120) performs operations associated with polarization indication signaling for CSI-RSs.

As shown in FIG. 10, in some aspects, process 1000 may include receiving, from a base station, a polarization indication that indicates a polarization associated with a CSI-RS resource set configuration (block 1010). For example, the user equipment (e.g., using antenna 252, demodulator 254, MIMO detector 256, receive processor 258, controller/processor 280, and/or memory 282) may receive, from a base station, a polarization indication that indicates a polarization associated with a CSI-RS resource set configuration, as described above.

As further shown in FIG. 10, in some aspects, process 1000 may include performing a communication with the base station based at least in part on the polarization associated with the CSI-RS resource set configuration (block 1020). For example, the user equipment (e.g., using antenna 252, demodulator 254, MIMO detector 256, receive processor 258, transmit processor 264, TX MIMO processor 266, modulator 254, controller/processor 280, and/or memory 282) may perform a communication with the base station based at least in part on the polarization associated with the CSI-RS resource set configuration, as described above.

Process 1000 may include additional aspects, such as any single aspect or any combination of aspects described below and/or in connection with one or more other processes described elsewhere herein.

In a first aspect, the polarization associated with the CSI-RS resource set configuration corresponds to a polarization of a bandwidth part associated with the CSI-RS resource set configuration, wherein the bandwidth part is associated with a polarization configuration that defines the polarization of the bandwidth part.

In a second aspect, alone or in combination with the first aspect, process 1000 includes receiving, from the base station, polarization indications corresponding to polarizations for individual CSI-RSs associated with the CSI-RS resource set configuration, wherein the polarization indications may correspond to different polarizations for the individual CSI-RSs.

In a third aspect, alone or in combination with one or more of the first and second aspects, process 1000 includes receiving, from the base station, a time gap configuration that configures a time gap between a first CSI-RS associated with the CSI-RS resource set configuration and a second CSI-RS associated with the CSI-RS resource set configuration, wherein the first CSI-RS is associated with a bandwidth part and a first polarization, and the second CSI-RS is associated with the bandwidth part and a second polarization, and changing between the first polarization when measuring the first CSI-RS and the second polarization when measuring the second CSI-RS, based at least in part on the time gap configuration that configures the time gap between the first CSI-RS and the second CSI-RS.

In a fourth aspect, alone or in combination with one or more of the first through third aspects, process 1000 includes receiving, from the base station, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

In a fifth aspect, alone or in combination with one or more of the first through fourth aspects, process 1000 includes receiving, from the base station, a comb structure configuration that configures a first comb structure for a first CSI-RS in a bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization.

In a sixth aspect, alone or in combination with one or more of the first through fifth aspects, the first comb structure for the first CSI-RS does not overlap in a frequency domain with the second comb structure for the second CSI-RS.

In a seventh aspect, alone or in combination with one or more of the first through sixth aspects, the polarization associated with the CSI-RS resource set configuration is one of a right hand circular polarization, a left hand circular polarization, a vertical linear polarization, or a horizontal linear polarization.

In an eighth aspect, alone or in combination with one or more of the first through seventh aspects, a polarization of a CSI-RS corresponds to the polarization associated with the CSI-RS resource set configuration, wherein the polarization associated with the CSI-RS resource set configuration corresponds to a polarization of a bandwidth part associated with the CSI-RS resource set configuration.

In a ninth aspect, alone or in combination with one or more of the first through eighth aspects, a polarization of a CSI-RS corresponds to the polarization associated with the CSI-RS resource set configuration which includes the CSI-RS, wherein a bandwidth part associated with the CSI-RS resource set configuration is not associated with a polarization configuration.

In a tenth aspect, alone or in combination with one or more of the first through ninth aspects, the CSI-RS resource set configuration includes a CSI-RS resource configured with the polarization.

In an eleventh aspect, alone or in combination with one or more of the first through tenth aspects, process 1000 includes determining the polarization for the CSI-RS resource based at least in part on an index, wherein the polarization is explicitly configured in the CSI-RS resource and the index represents one polarization selected from a plurality of polarizations.

In a twelfth aspect, alone or in combination with one or more of the first through eleventh aspects, the polarization for the CSI-RS resource is a nominal polarization mapped to an actual polarization based at least in part on a detection of a prior synchronization signal block.

In a thirteenth aspect, alone or in combination with one or more of the first through twelfth aspects, process 1000 includes determining the polarization for the CSI-RS resource based at least in part on a transmission configuration indicator state.

In a fourteenth aspect, alone or in combination with one or more of the first through thirteenth aspects, process 1000 includes determining the polarization for the CSI-RS resource based at least in part on a polarization of a CSI-RS associated with the CSI-RS resource.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
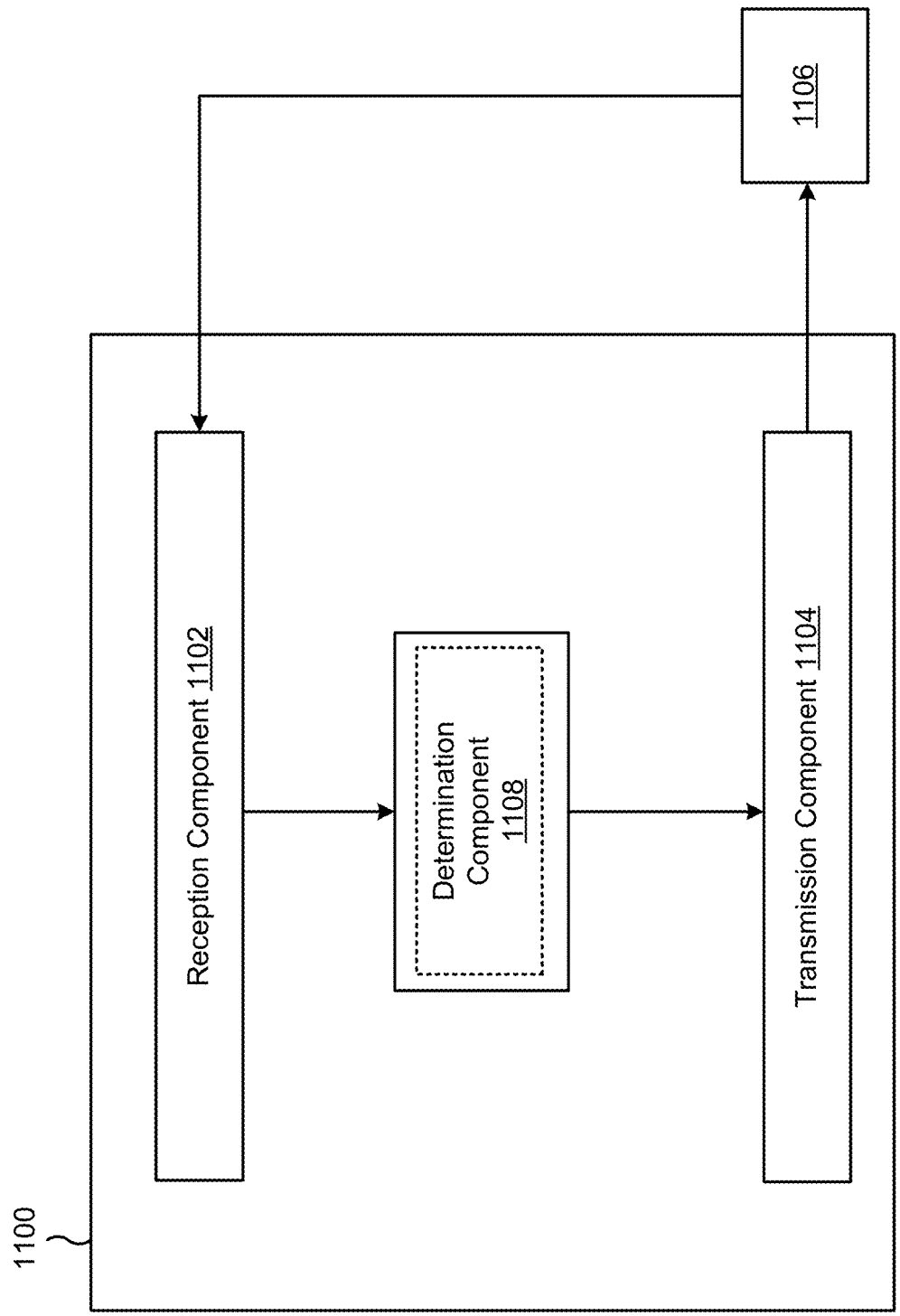
FIGS. 11-12 are block diagrams of example apparatuses for wireless communication, in accordance with the present disclosure.

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be collocated with the reception component 1102 in a transceiver.

The determination component 1108 may determine a polarization associated with a CSI-RS resource set configuration. In some aspects, the determination component 1108 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The transmission component 1104 may transmit, to a user equipment, a polarization indication that indicates the polarization associated with the CSI-RS resource set configuration.

The determination component 1108 may determine polarizations for individual CSI-RSs associated with the CSI-RS resource set configuration. The transmission component 1104 may transmit polarization indications corresponding to the individual CSI-RSs, wherein the polarization indications may correspond to different polarizations for the individual CSI-RSs.

The determination component 1108 may determine a first polarization of a first CSI-RS in a bandwidth part, wherein the first CSI-RS is associated with the CSI-RS resource set configuration. The determination component 1108 may determine a second polarization of a second CSI-RS in the bandwidth part, wherein the second CSI-RS is associated with the CSI-RS resource set configuration. The transmission component 1104 may transmit, to the user equipment, a time gap configuration that configures a time gap between the first CSI-RS and the second CSI-RS, wherein the time gap enables the user equipment to change between the first polarization when measuring the first CSI-RS to the second polarization when measuring the second CSI-RS.

The transmission component 1104 may transmit, to the user equipment, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

The transmission component 1104 may transmit, to the user equipment, a comb structure configuration that configures a first comb structure for a first CSI-RS in a bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization.

The determination component 1108 may determine the polarization for the CSI-RS resource based at least in part on an index, wherein the polarization is explicitly configured in the CSI-RS resource and the index represents one polarization selected from a plurality of polarizations. The determination component 1108 may determine the polarization for the CSI-RS resource based at least in part on a transmission configuration indicator state. The determination component 1108 may determine the polarization for the CSI-RS resource based at least in part on a polarization of a CSI-RS associated with the CSI-RS resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
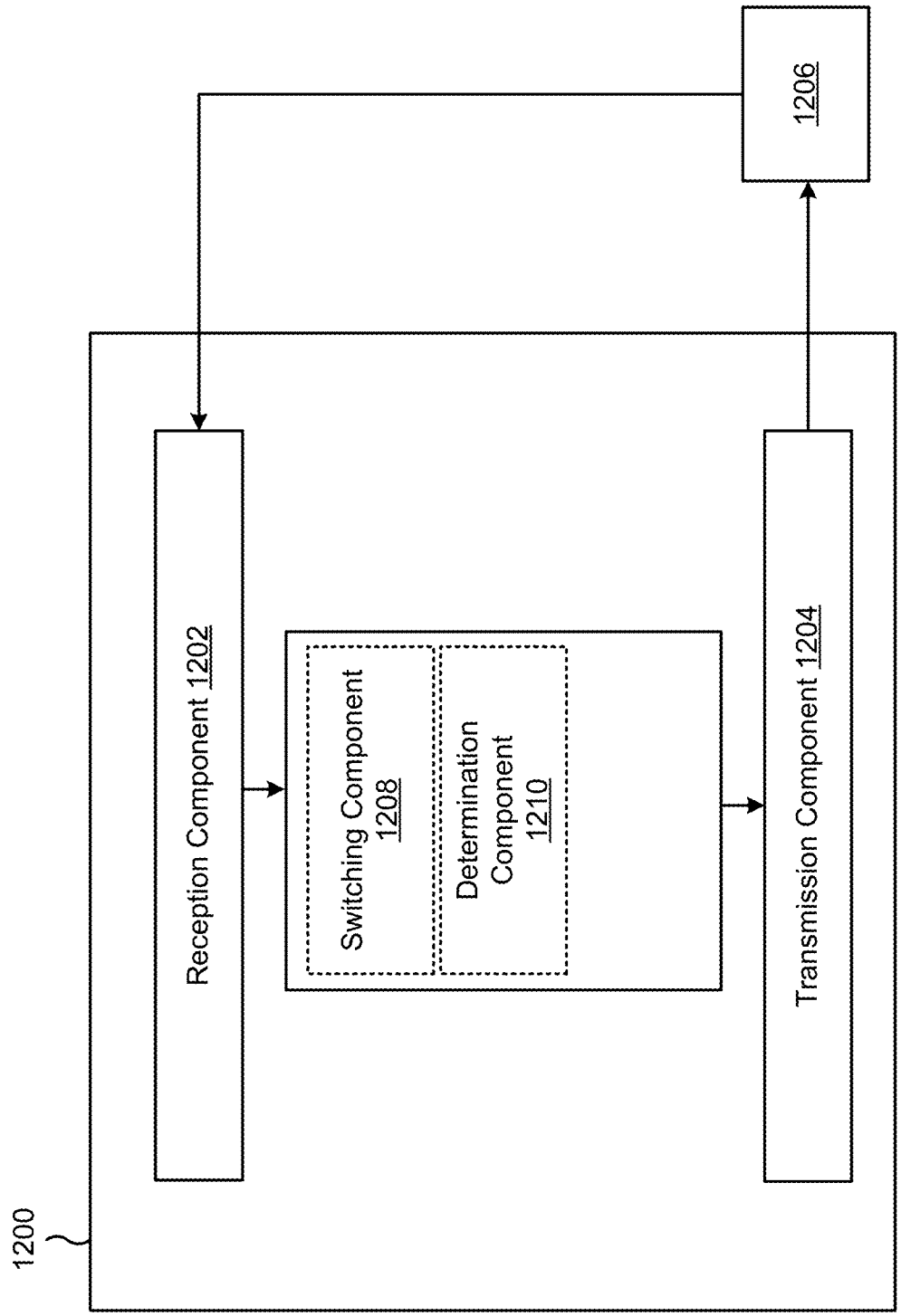

FIG. 12 is a block diagram of an example apparatus 1200 for wireless communication. The apparatus 1200 may be a user equipment, or a user equipment may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a switching component 1208, or a determination component 1210, among other examples.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the user equipment described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the user equipment described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the user equipment described above in connection with FIG. 2. In some aspects, the transmission component 1204 may be collocated with the reception component 1202 in a transceiver.

The reception component 1202 may receive, from a base station, a polarization indication that indicates a polarization associated with a CSI-RS resource set configuration. The transmission component 1204 may perform a communication with the base station based at least in part on the polarization associated with the CSI-RS resource set configuration.

The reception component 1202 may receive, from the base station, polarization indications corresponding to polarizations for individual CSI-RSs associated with the CSI-RS resource set configuration, wherein the polarization indications may correspond to different polarizations for the individual CSI-RSs.

The reception component 1202 may receive, from the base station, a time gap configuration that configures a time gap between a first CSI-RS associated with the CSI-RS resource set configuration and a second CSI-RS associated with the CSI-RS resource set configuration, wherein the first CSI-RS is associated with a bandwidth part and a first polarization, and the second CSI-RS is associated with the bandwidth part and a second polarization. The switching component 1208 may change between the first polarization when measuring the first CSI-RS and the second polarization when measuring the second CSI-RS, based at least in part on the time gap configuration that configures the time gap between the first CSI-RS and the second CSI-RS. In some aspects, the switching component 1208 may include one or more antennas, a demodulator, a MIMO detector, a receive processor, a modulator, a transmit MIMO processor, a transmit processor, a controller/processor, a memory, or a combination thereof, of the user equipment described above in connection with FIG. 2.

The reception component 1202 may receive, from the base station, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

The reception component 1202 may receive, from the base station, a comb structure configuration that configures a first comb structure for a first CSI-RS in a bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization.

The determination component 1210 may determine the polarization for the CSI-RS resource based at least in part on an index, wherein the polarization is explicitly configured in the CSI-RS resource and the index represents one polarization selected from a plurality of polarizations. The determination component 1210 may determine the polarization for the CSI-RS resource based at least in part on a transmission configuration indicator state. The determination component 1210 may determine the polarization for the CSI-RS resource based at least in part on a polarization of a CSI-RS associated with the CSI-RS resource. In some aspects, the determination component 1210 may include one or more antennas, a demodulator, a MIMO detector, a receive processor, a modulator, a transmit MIMO processor, a transmit processor, a controller/processor, a memory, or a combination thereof, of the user equipment described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a base station, comprising: determining a polarization associated with a channel state information reference signal (CSI-RS) resource set configuration; and transmitting, to a user equipment, a polarization indication that indicates the polarization associated with the CSI-RS resource set configuration.

Aspect 2: The method of Aspect 1, wherein the polarization associated with the CSI-RS resource set configuration corresponds to a polarization of a bandwidth part associated with the CSI-RS resource set configuration, wherein the bandwidth part is associated with a polarization configuration that defines the polarization of the bandwidth part.

Aspect 3: The method of any of Aspects 1 through 2, further comprising: determining polarizations for individual CSI-RSs associated with the CSI-RS resource set configuration; and transmitting polarization indications corresponding to the individual CSI-RSs, wherein the polarization indications may correspond to different polarizations for the individual CSI-RSs.

Aspect 4: The method of any of Aspects 1 through 3, further comprising: determining a first polarization of a first CSI-RS in a bandwidth part, wherein the first CSI-RS is associated with the CSI-RS resource set configuration; and determining a second polarization of a second CSI-RS in the bandwidth part, wherein the second CSI-RS is associated with the CSI-RS resource set configuration; or transmitting, to the user equipment, a time gap configuration that configures a time gap between the first CSI-RS and the second CSI-RS, wherein the time gap enables the user equipment to change between the first polarization when measuring the first CSI-RS to the second polarization when measuring the second CSI-RS.

Aspect 5: The method of any of Aspects 1 through 4, further comprising: transmitting, to the user equipment, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

Aspect 6: The method of any of Aspects 1 through 5, further comprising: transmitting, to the user equipment, a comb structure configuration that configures a first comb structure for a first CSI-RS in a bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization, wherein the first comb structure for the first CSI-RS does not overlap in a frequency domain with the second comb structure for the second CSI-RS.

Aspect 7: The method of any of Aspects 1 through 6, wherein the polarization associated with the CSI-RS resource set configuration is one of: a right hand circular polarization, a left hand circular polarization, a vertical linear polarization, or a horizontal linear polarization.

Aspect 8: The method of any of Aspects 1 through 7, wherein a polarization of a CSI-RS corresponds to the polarization associated with the CSI-RS resource set configuration, wherein the polarization associated with the CSI-RS resource set configuration corresponds to a polarization of a bandwidth part associated with the CSI-RS resource set configuration.

Aspect 9: The method of any of Aspects 1 through 8, wherein a polarization of a CSI-RS corresponds to the polarization associated with the CSI-RS resource set configuration which includes the CSI-RS, wherein a bandwidth part associated with the CSI-RS resource set configuration is not associated with a polarization configuration.

Aspect 10: The method of any of Aspects 1 through 9, wherein the CSI-RS resource set configuration includes a CSI-RS resource configured with the polarization.

Aspect 11: The method of Aspect 10, further comprising: determining the polarization for the CSI-RS resource based at least in part on an index, wherein the polarization is explicitly configured in the CSI-RS resource and the index represents one polarization selected from a plurality of polarizations; determining the polarization for the CSI-RS resource based at least in part on a transmission configuration indicator state; or determining the polarization for the CSI-RS resource based at least in part on a polarization of a CSI-RS associated with the CSI-RS resource.

Aspect 12: The method of Aspect 10, wherein the polarization for the CSI-RS resource is a nominal polarization mapped to an actual polarization based at least in part on a detection of a prior synchronization signal block.

Aspect 13: A method of wireless communication performed by a user equipment, comprising: receiving, from a base station, a polarization indication that indicates a polarization associated with a channel state information reference signal (CSI-RS) resource set configuration; and performing a communication with the base station based at least in part on the polarization associated with the CSI-RS resource set configuration.

Aspect 14: The method of Aspect 13, wherein the polarization associated with the CSI-RS resource set configuration corresponds to a polarization of a bandwidth part associated with the CSI-RS resource set configuration, wherein the bandwidth part is associated with a polarization configuration that defines the polarization of the bandwidth part.

Aspect 15: The method of any of Aspects 13 through 14, further comprising: receiving, from the base station, polarization indications corresponding to polarizations for individual CSI-RSs associated with the CSI-RS resource set configuration, wherein the polarization indications may correspond to different polarizations for the individual CSI-RSs.

Aspect 16: The method of any of Aspects 13 through 15, further comprising: receiving, from the base station, a time gap configuration that configures a time gap between a first CSI-RS associated with the CSI-RS resource set configuration and a second CSI-RS associated with the CSI-RS resource set configuration, wherein the first CSI-RS is associated with a bandwidth part and a first polarization, and the second CSI-RS is associated with the bandwidth part and a second polarization; and changing between the first polarization when measuring the first CSI-RS and the second polarization when measuring the second CSI-RS, based at least in part on the time gap configuration that configures the time gap between the first CSI-RS and the second CSI-RS.

Aspect 17: The method of any of Aspects 13 through 16, further comprising: receiving, from the base station, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

Aspect 18: The method of any of Aspects 13 through 17, further comprising: receiving, from the base station, a comb structure configuration that configures a first comb structure for a first CSI-RS in a bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization, wherein the first comb structure for the first CSI-RS does not overlap in a frequency domain with the second comb structure for the second CSI-RS.

Aspect 19: The method of any of Aspects 13 through 18, wherein the polarization associated with the CSI-RS resource set configuration is one of: a right hand circular polarization, a left hand circular polarization, a vertical linear polarization, or a horizontal linear polarization.

Aspect 20: The method of any of Aspects 13 through 19, wherein a polarization of a CSI-RS corresponds to the polarization associated with the CSI-RS resource set configuration, wherein the polarization associated with the CSI-RS resource set configuration corresponds to a polarization of a bandwidth part associated with the CSI-RS resource set configuration.

Aspect 21: The method of any of Aspects 13 through 20, wherein a polarization of a CSI-RS corresponds to the polarization associated with the CSI-RS resource set configuration which includes the CSI-RS, wherein a bandwidth part associated with the CSI-RS resource set configuration is not associated with a polarization configuration.

Aspect 22: The method of any of Aspects 13 through 21, wherein the CSI-RS resource set configuration includes a CSI-RS resource configured with the polarization.

Aspect 23: The method of Aspect 22, further comprising: determining the polarization for the CSI-RS resource based at least in part on an index, wherein the polarization is explicitly configured in the CSI-RS resource and the index represents one polarization selected from a plurality of polarizations; determining the polarization for the CSI-RS resource based at least in part on a transmission configuration indicator state; or determining the polarization for the CSI-RS resource based at least in part on a polarization of a CSI-RS associated with the CSI-RS resource.

Aspect 24: The method of Aspect 22, wherein the polarization for the CSI-RS resource is a nominal polarization mapped to an actual polarization based at least in part on a detection of a prior synchronization signal block.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network entity, comprising:
   determining a polarization associated with a channel state information reference signal (CSI-RS) resource set configuration that is associated with a bandwidth part; and
   transmitting, to a user equipment, a polarization indication that indicates the polarization associated with the CSI-RS resource set configuration.

2. The method of claim 1, wherein the polarization associated with the CSI-RS resource set configuration corresponds to a polarization of the bandwidth part, wherein the bandwidth part is associated with a polarization configuration that defines the polarization of the bandwidth part.

3. The method of claim 1, further comprising:
   determining polarizations for individual CSI-RSs associated with the CSI-RS resource set configuration; and
   transmitting polarization indications corresponding to the individual CSI-RSs, wherein the polarization indications may correspond to different polarizations for the individual CSI-RSs.

4. The method of claim 1, further comprising:
   determining a first polarization of a first CSI-RS in the bandwidth part, wherein the first CSI-RS is associated with the CSI-RS resource set configuration; and
   determining a second polarization of a second CSI-RS in the bandwidth part, wherein the second CSI-RS is associated with the CSI-RS resource set configuration; or
   transmitting, to the user equipment, a time gap configuration that configures a time gap between the first CSI-RS and the second CSI-RS, wherein the time gap enables the user equipment to change between the first polarization when measuring the first CSI-RS to the second polarization when measuring the second CSI-RS.

5. The method of claim 1, further comprising:
   transmitting, to the user equipment, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

6. The method of claim 1, further comprising:
   transmitting, to the user equipment, a comb structure configuration that configures a first comb structure for a first CSI-RS in the bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization, wherein the first comb structure for the first CSI-RS does not overlap in a frequency domain with the second comb structure for the second CSI-RS.

7. The method of claim 1, wherein the polarization associated with the CSI-RS resource set configuration is one of: a right hand circular polarization, a left hand circular polarization, a vertical linear polarization, or a horizontal linear polarization.

8. The method of claim 1, wherein a polarization of a CSI-RS corresponds to the polarization associated with the CSI-RS resource set configuration, wherein the polarization associated with the CSI-RS resource set configuration corresponds to a polarization of the bandwidth part.

9. The method of claim 1, wherein a polarization of a CSI-RS corresponds to the polarization associated with the CSI-RS resource set configuration which includes the CSI-RS, wherein the bandwidth part is not associated with a polarization configuration.

10. The method of claim 1, wherein the CSI-RS resource set configuration includes a CSI-RS resource configured with the polarization.

11. The method of claim 10, further comprising:
    determining the polarization for the CSI-RS resource based at least in part on an index, wherein the polarization is explicitly configured in the CSI-RS resource and the index represents one polarization selected from a plurality of polarizations;
    determining the polarization for the CSI-RS resource based at least in part on a transmission configuration indicator state; or
    determining the polarization for the CSI-RS resource based at least in part on a polarization of a CSI-RS associated with the CSI-RS resource.

12. The method of claim 10, wherein the polarization for the CSI-RS resource is a nominal polarization mapped to an actual polarization based at least in part on a detection of a prior synchronization signal block.

13. A method of wireless communication performed by a user equipment, comprising:
    receiving, from a network entity, a polarization indication that indicates a polarization associated with a channel state information reference signal (CSI-RS) resource set configuration that is associated with a bandwidth part; and
    performing a communication with the network entity based at least in part on the polarization associated with the CSI-RS resource set configuration.

14. The method of claim 13, wherein the polarization associated with the CSI-RS resource set configuration corresponds to a polarization of the bandwidth part, wherein the bandwidth part is associated with a polarization configuration that defines the polarization of the bandwidth part.

15. The method of claim 13, further comprising:
    receiving, from the network entity, polarization indications corresponding to polarizations for individual CSI-RSs associated with the CSI-RS resource set configuration, wherein the polarization indications may correspond to different polarizations for the individual CSI-RSs.

16. The method of claim 13, further comprising:
    receiving, from the network entity, a time gap configuration that configures a time gap between a first CSI-RS associated with the CSI-RS resource set configuration and a second CSI-RS associated with the CSI-RS resource set configuration, wherein the first CSI-RS is associated with the bandwidth part and a first polarization, and the second CSI-RS is associated with the bandwidth part and a second polarization; and changing between the first polarization when measuring the first CSI-RS and the second polarization when measuring the second CSI-RS, based at least in part on the time gap configuration that configures the time gap between the first CSI-RS and the second CSI-RS.

17. The method of claim 13, further comprising:
receiving, from the network entity, a CSI-RS configuration that configures a first CSI-RS and a second CSI-RS to overlap in time in a single bandwidth part, wherein the first CSI-RS and the second CSI-RS are associated with the CSI-RS resource set configuration, and the first CSI-RS is associated with a first polarization and the second CSI-RS is associated with a second polarization.

18. The method of claim 13, further comprising:
receiving, from the network entity, a comb structure configuration that configures a first comb structure for a first CSI-RS in the bandwidth part and a second comb structure for a second CSI-RS in the bandwidth part, wherein the first CSI-RS and the second CSI-RS are associated with the CSI-RS resource set configuration, and the first CSI-RS is associated with a first polarization and the second CSI-RS is associated with a second polarization, wherein the first comb structure for the first CSI-RS does not overlap in a frequency domain with the second comb structure for the second CSI-RS.

19. The method of claim 13, wherein the polarization associated with the CSI-RS resource set configuration is one of: a right hand circular polarization, a left hand circular polarization, a vertical linear polarization, or a horizontal linear polarization.

20. The method of claim 13, wherein a polarization of a CSI-RS corresponds to the polarization associated with the CSI-RS resource set configuration, wherein the polarization associated with the CSI-RS resource set configuration corresponds to a polarization of the bandwidth part.

21. The method of claim 13, wherein a polarization of a CSI-RS corresponds to the polarization associated with the CSI-RS resource set configuration which includes the CSI-RS, wherein the bandwidth part is not associated with a polarization configuration.

22. The method of claim 13, wherein the CSI-RS resource set configuration includes a CSI-RS resource configured with the polarization.

23. The method of claim 22, further comprising:
determining the polarization for the CSI-RS resource based at least in part on an index, wherein the polarization is explicitly configured in the CSI-RS resource and the index represents one polarization selected from a plurality of polarizations;
determining the polarization for the CSI-RS resource based at least in part on a transmission configuration indicator state; or
determining the polarization for the CSI-RS resource based at least in part on a polarization of a CSI-RS associated with the CSI-RS resource.

24. The method of claim 22, wherein the polarization for the CSI-RS resource is a nominal polarization mapped to an actual polarization based at least in part on a detection of a prior synchronization signal block.

25. A network entity for wireless communication, comprising:
a memory; and
one or more processors, coupled to the memory, configured to:
determine a polarization associated with a channel state information reference signal (CSI-RS) resource set configuration that is associated with a bandwidth part; and
transmit, to a user equipment, a polarization indication that indicates the polarization associated with the CSI-RS resource set configuration.

26. The network entity of claim 25, wherein the polarization associated with the CSI-RS resource set configuration corresponds to a polarization of the bandwidth part, wherein the bandwidth part is associated with a polarization configuration that defines the polarization of the bandwidth part.

27. The network entity of claim 25, wherein the one or more processors are further configured to:
determine polarizations for individual CSI-RSs associated with the CSI-RS resource set configuration; and
transmit polarization indications corresponding to the individual CSI-RSs, wherein the polarization indications may correspond to different polarizations for the individual CSI-RSs.

28. A user equipment for wireless communication, comprising:
a memory; and
one or more processors, coupled to the memory, configured to:
receive, from a network entity, a polarization indication that indicates a polarization associated with a channel state information reference signal (CSI-RS) resource set configuration that is associated with a bandwidth part; and
perform a communication with the network entity based at least in part on the polarization associated with the CSI-RS resource set configuration.

29. The user equipment of claim 28, wherein the polarization associated with the CSI-RS resource set configuration corresponds to a polarization of the bandwidth part, wherein the bandwidth part is associated with a polarization configuration that defines the polarization of the bandwidth part.

30. The user equipment of claim 28, wherein the one or more processors are further configured to:
receive, from the network entity, polarization indications corresponding to polarizations for individual CSI-RSs associated with the CSI-RS resource set configuration, wherein the polarization indications may correspond to different polarizations for the individual CSI-RSs.

* * * * *